3,069,451
PREPARATION OF ORGANIC SILICON COMPOUNDS
Gerhard Fritz, Marburg (Lahn), Germany
No Drawing. Filed Sept. 6, 1956, Ser. No. 608,201
5 Claims. (Cl. 260—448.2)

This invention relates to organic silicon compounds. It more particularly relates to a method of preparing organic silicon compounds and certain new and useful compounds of this type.

This application is a continuation in part of my co-pending application, Serial No. 257,656, filed November 21, 1951, now abandoned.

The preparaton of certain known organic silicon compounds have been effected with the use of tri-halogen silanes as a starting material. These silanes were converted under pressure and in the presence of a catalyst possibly with radiation by ultra-violet light, with hydrocarbons containing double bonds and which were also substituted in part. This known method in general produces organic silicon compounds which contain 3 halogen atoms bound to the silicon and in which the organic radical always has the same number of carbon atoms as the starting hydrocarbon. These tri-halogen silanes, however, are unsuitable as starting material for the preparation of silicones having Si—O—Si chains in which two organic radicals are bound to each silicon. Furthermore, it is not possible, according to this known method, to bind one or more methyl groups to the silicon. Compounds of this type could, up to the present time, only be obtained from silanes by a complicated and indirect method with use of the dichlorosilane by reacting with zinc methide. This method is extremely difficult and impractical and therefore cannot be used industrially.

One object of this invention is a method for the preparation of organic silicon compounds which overcomes the aforementioned difficulties.

A further object of this invention is a method for preparing substituted organo silanes in which any desired number of hydrogen atoms may be substituted by hydrocarbon or silicon hydrocarbon radicals.

A still further object of this invention is a method for the preparation of substituted silanes which also contain other elements such as chlorine or other halogens, oxygen, nitrogen, sulfur and related elements.

A still further object of this invention is a preparation of certain new and useful organic silicon compounds. These, and still further objects, will become apparent from the following description:

In accordance with the invention, silicon compounds having not in excess of 2 halogen atoms for each silicon atom and containing at least one Si—H bond are reacted at relatively high temperatures with a carbon compound selected from the group consisting of saturated hydrocarbons, ethers, esters, aldehydes, ketones and organic oxides.

The new method in accordance with the invention has many new and surprising advantages over the prior methods. In accordance with the new method it is possible to use saturated hydrocarbons as starting materials where hithertofore it was only possible to use unsaturated hydrocarbons. The new method allows the formation of silicon compounds particularly alkyl silanes having hydrocarbon radicals of a greater or lesser number of carbon atoms than originally contained therein to be bound to the silicon in the radical. In addition, the new method makes it possible to prepare compounds having Si—C—Si bonds. Finally, the new method allows the saturation of not only one silicon bond by hydrocarbon radicals or even silicon hydrocarbon radicals, but even the saturation of several or all of them.

As a starting silicon material, in accordance with the invention, there may be used any desired compounds having Si—H or Si—Si bonds, such as the compounds which can be obtained, for example, by the hydrolysis of silicides. Thus, silanes ($SiH_4$, $Si_2H_6$, $Si_3H_8$, $Si_4H_{10}$) or their derivatives, as well as hydrolysis products, siloxene and its derivatives and polymeric $SiH_2$ and similar substances may be used in accordance with the invention as silicon starting materials. The carbon compounds which may be used in accordance with the invention are preferably hydrogen-containing compounds which, as already mentioned, contain single bonds, open chains and/or rings. These compounds can comprise, for example, pentane, ethane, propane, butane, cyclohexane, their homologues, etc. These carbon compounds may be substituted as desired, in which connection halide compounds and particularly chlorided compounds, as, for example, methyl chloride, ethyl chloride, butyl chloride, or the like, have proven particularly adaptable. It is also possible to use oxygen-containing carbon compounds, such as diethyl ether, acetone, ethyl acetate, formaldehyde, acetaldehyde, ethylene oxide, etc.

It has been found possible in accordance with the invention to form the other reagent in situ, for example, in such a manner that ethyl or propyl chloride are introduced into the process. This also applies analogously to the silicon-containing starting materials in connection with which the silicon compounds, having Si—H or Si—Si bonds, can be prepared by the reaction of suitable substances.

It has furthermore been found that when using oxygen-containing carbon compounds mentioned and generally ethers, esters, aldehydes, ketones or organic oxides, it is possible to replace one or more of the hydrogen atoms contained in silicon compounds having Si—H or Si—Si bonds by OR radicals or by oxygen-containing silicon-hydrocarbon radicals in which one or more hydrogen atoms may in their return be suitably substituted. The reaction, for example, between $SiH_4$ and oxygen-containing hydrocarbons such as diethyl ether, acetone or ethylene oxide at temperatures of about 450° C. primarily have been found to yield alkoxy silanes of the type $ROSiH_3$. The reaction of $SiH_4$ with diethyl ether gives gaseous, easily volatile high boiling substances which are identified as organic silicon products having Si—H bonds. Thus, for instance, there are produced products of the type $(H_5C_2O)_2HSiOSiH(OC_2H_5)_2$.

The reaction of $SiH_4$ with ethylene oxide at about 450° C. also gives predominantly gaseous organic silicon compounds from which the compounds $H_5C_2OSiH_3$ as well as $H_7C_3OSiH_3$ can be isolated. In addition to these, there are furthermore produced during this reaction other silicon-containing compounds, for instance of the type $(RO)_2SiH_2$, $(RO)_3SiH$ and $(RO)_4Si$ as well as difficultly volatile condensed substances. In this connection, R may be various organic radicals (alkyl, aryl, aralkyl, etc.). By the method according to the present invention there is thus afforded the very general possibility of directly obtaining alkoxy silanes with or even without Si—H bonds. In this connection, the alkoxy silanes with two or three hydrogen atoms directly bound to the silicon constitute useful compounds which were not heretofore known. The products obtained in accordance with the present invention can be converted, as set forth, into further compounds, as, for example, compounds having Si—O—Si chains which bear OR groups at the free valences of the silicon. Furthermore, from the products obtained by the new method, there can be obtained, by further conversion in accordance therewith, compounds which contain R groups, in addition to OR groups, bound to the silicon.

In accordance with the present invention, the silane or other organic reagent is converted at a relatively high temperature, and above its decomposition temperature.

Thus, for example, temperatures ranging from above 300° C. and preferably from about 400° C. are employed. The reaction can be carried out under vacuum and not to exceed normal or atmospheric pressure. If desired, recourse to the use of catalysts such as silicon and/or low silicon oxides or ultra-violet light can be had. The reaction can be carried out batchwise or continuously; it being advantageous, especially in the latter case, to see to the rapid removal of the heat of reaction.

By the new method, there may be obtained compounds which, in the same manner as $CH_3SiH_3$, $C_2H_5SiH_3$ or similar substances have only one hydrocarbon radical bound to one silicon atom, or else compounds of the general formula $R_2SiH_2$, for instance $CH_3C_2H_5SiH_2$ or $CH_3C_3H_7SiH_2$, $(C_2H_5)_2SiH_2$, or the like, or also compounds of the type $R_3SiH$ and $R_4Si$, in which one or more hydrogen atoms may also be substituted by silicon-hydrocarbon radicals, for instance $$(C_2H_5)_2CH_3SiCH_2SiCH_3(C_2H_5)_2$$

Upon the termination of the reaction, there are generally produced liquid and solid reaction products in addition to gaseous reaction products. Depending on the reaction temperature, the pressure and the reaction time, it is possible to increase the yields of the individual products. Viscous oils and solid products can be obtained which consist solely of silicon, carbon and hydrogen.

The still unsubstituted hydrogen in the compounds prepared by the method according to the present invention makes it possible to convert these compounds into Si—OH or Si—O—Si—containing substances by an oxidation which can be effected in various manners. In this manner there are produced silicon-like substances having similar properties, as, for example, water-repellent properties, which, however, can be employed by simply passing the gaseous products over the surfaces to be treated or into the containers or the like to the treated, without the possibility of the production of injurious substances occurring. As compared with the use of alkyl chloride silanes for the same purpose, this affords the advantage that no acid is produced during the hydrolysis.

The substances obtained in the reaction, and particularly the viscous oils of different viscosity, have other useful properties. Thus, these oils, when applied to surfaces, harden by exposure to the air and form lacquer-like coatings which can be utilized, for example, for anti-rust purposes. By the application of sufficiently thick layers on metallic, glass or even rubber surfaces or the like, these surfaces can be imparted good resistance to the action of, for example, acids or organic substances, such as solvents. In addition, these substances can be used as adhesives, for example, for cementing metals to each other or metals to other substances, or for the cementing of glass, porcelain or the like.

There are further possibilities of use of these compounds as lubricating oils, filling oils for high vacuum pumps, transformer or switch oils, and for any purposes in which resistance to surface leakage current is important, as for example, in storage batteries or the like. They may also be used as mold paints, protecting or impregnating agents, for example, for wood, insulation material in the electric industry or the like, starting materials for hardenable synthetic resins and similar purposes. In addition, they can, in many cases, be colored. Some of the substances have plastic or elastic properties so that they can be used for corresponding purposes.

The following examples will further serve to illustrate the new method in accordance with the invention and certain new and useful organic silicon compounds obtained thereby. These examples are in no way intended to limit the scope of the invention.

EXAMPLE I

Monosilane and pentane were reacted in a suitable reaction vessel at 450° C. with a total pressure of 570 mm. The pressure of the pentane was 380 mm. and that of the $SiH_4$ 190 mm. Hg; the reaction time was ¾ hour. The reaction products consisted of the following:

| | Percent |
|---|---|
| $CH_3SiH_3$ | 6 |
| $C_2H_5SiH_3$ | 10 |
| 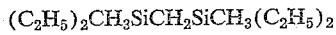 | 4 |
| $(CH_3)_2SiH_2$ | 8 |
| $(C_2H_5)_2SiH_2$ | 7 |
| Oils products, f.i. $(CH_3)_3(C_2H_5)_3Si_2$ | 15 |
| Solids products, f.i. $(SiCH_3)_x$ | 5 |

EXAMPLE II

Monosilane and ethylene oxide were reacted in a suitable reaction vessel at about 450° C. and a total pressure of 511 mm. The ethylene oxide pressure was 300 mm. and that of the $SiH_4$ 211 mm. The time of the reaction was about 1 hour.

The $SiH_4$ is converted down to a small amount which is deposited as Si. The reaction products are present in approximately the following percentages:

| | Percent |
|---|---|
| Light boiling substances | 12.5 |
| $H_3SiOC_2H_5$ | 43 |
| $H_3SiOC_3H_7$ | 25 |
| High boiling substances | 19.5 |

EXAMPLE III $SiH_4$ and $(H_5C_2)_2O$ were reacted at about 450° C. under the above-described conditions. The $SiH_4$ reacted extensively. The pressure of the ether was 300 mm. Hg, and that of the $SiH_2$ 200 mm.; total pressure 500 mm. Hg. The reaction products were present in approximately the following percentages:

| | Percent |
|---|---|
| Light boiling products | 10 |
| $H_3SiOC_2H_5$ | 60 |
| High boiling substances (including $(H_5C_2O)_2HSiOSiH(OC_2H_5)_2$) | 30 |

EXAMPLE IV $SiH_4$ and acetone were reacted at 450° C. in the same manner. The $SiH_4$ was extensively used up. The pressure of the acetone was 250 mm. Hg and that of the $SiH_4$ 180 mm. Hg. Total pressure 430 mm. Hg. The reaction products were present in approximately the following percentages:

| | Percent |
|---|---|
| Light boiling substances | 5 |
| $H_3SiOC_3H_7$ | 85 |
| High boiling substances | 10 |

In accordance with the invention, the following new and useful organic silicon compounds may be obtained:

$$\begin{array}{c} C_3H_7 \\ \diagdown \\ \phantom{xx}SiH_2 \\ \diagup \\ CH_3 \end{array}$$

$$\begin{array}{c} H_7C_3 \\ \diagdown \\ \phantom{xx}Si(OC_2H_5)_2 \\ \diagup \\ H_3C \end{array}$$

Trimethyl-triethyl-disilane $(CH_3)_3(C_2H_5)_3Si_2$
Tetarethyl-methyl-disilane $(C_2H_5)_4CH_3Si_2H$
Tetraethyl-pentamethyl-trisilane $(C_2H_5)_3(CH_3)_5Si_3$
Hexaethyl-tetramethyl-tetrasilane $(C_2H_5)_6(CH_3)_4Si_4$
$(SiCH_3)_x$ Polymer
$(Si_2ClR)_x$ Polymer R=Butyl
$H_5C_2OSiH_3$
$H_7C_3OSiH_3$
$H_7C_3OSi(OC_2H_5)_3$
$H_7C_3OSi(OCH_3)_3$ The small "$x$" used in the formulas herein and in the claims designates a multiple of the radical in the parentheses indicating a polymer.

I claim:
1. A method for the preparation of an organic silicon compound which comprises intimately contacting and reacting a silicon compound containing an Si—H bond selected from the group consisting of an unsubstituted silane, siloxene and polymeric $SiH_2$, with an oxygen-substituted lower, saturated aliphatic hydrocarbon compound, at a temperature of 300–600° C., and a pressure not in excess of atmospheric pressure.

2. A method according to claim 1 in which said carbon compound is ethylene oxide.

3. A method according to claim 1 in which said carbon compound is acetone.

4. A method for preparing an organic silicon compound comprising intimately contacting and reacting monosilane with ethylene oxide at a temperature ranging from 300–600° C. and a pressure not in excess of atmospheric pressure.

5. A method for the preparation of an organic silicon compound which comprises intimately contacting and reacting monosilane and ethylene oxide at a temperature of about 450° C. and while vacuum conditions are being maintained on the reactants.

References Cited in the file of this patent

UNITED STATES PATENTS

| | | |
|---|---|---|
| 2,379,821 | Miller et al. | July 3, 1945 |
| 2,444,784 | Meals | July 6, 1948 |
| 2,537,763 | Hurd | Jan. 9, 1951 |
| 2,554,193 | Hunter | May 22, 1951 |
| 2,632,013 | Wagner et al. | Mar. 17, 1953 |
| 2,682,512 | Agre | June 29, 1954 |
| 2,721,873 | MacKenzie et al. | Oct. 25, 1955 |

FOREIGN PATENTS

| | | |
|---|---|---|
| 1,054,055 | France | Oct. 7, 1953 |
| 730,379 | Great Britain | May 25, 1955 |

OTHER REFERENCES

Burkhard: "Jr. Am. Chem. So.," vol. 71 (1949), p. 963.

Fritz et al.: "Zeitschrift für Naturforschung," vol. 5B (December 9, 1950), pp. 395–6.

Fritz: "Zeitschrift für Naturforschung," vol. 6B (Mar. 24, 1951), pp. 47–48.

Fritz: "Zeitschrift für Naturforschung," vol. 6B (Apr. 20, 1951), p. 116.